United States Patent [19]

Kasai et al.

[11] 4,387,079

[45] Jun. 7, 1983

[54] METHOD OF MANUFACTURING HIGH-PURITY SILICON NITRIDE POWDER

[75] Inventors: Kiyoshi Kasai; Kohji Tsukuma; Takaaki Tsukidate, all of Kanagawa, Japan

[73] Assignee: Toyo Soda Manufacturing Co., Ltd., Shin Nanyo, Japan

[21] Appl. No.: 299,939

[22] Filed: Sep. 8, 1981

Related U.S. Application Data

[63] Continuation of Ser. No. 188,587, Sep. 18, 1980, abandoned, which is a continuation of Ser. No. 111,093, Jan. 10, 1980, abandoned.

[30] Foreign Application Priority Data

Jan. 10, 1979 [JP] Japan ................................... 54-751

[51] Int. Cl.$^3$ ........................................... C01B 21/068
[52] U.S. Cl. .................................. 423/344; 423/324; 423/406; 423/413
[58] Field of Search ............... 423/344, 324, 406, 413

[56] References Cited

FOREIGN PATENT DOCUMENTS

| 705317 | 3/1965 | Canada ................................. 423/344 |
| 54-124898 | 9/1979 | Japan ................................... 423/344 |
| 970639 | 3/1961 | United Kingdom ................. 423/344 |

OTHER PUBLICATIONS

Glemser et al, "Zeit schrift fur Amorganische Chemie", Band 298, 1959, pp. 134–141.
Mazdiyasni et al, "J. of the Amer. Ceramic Soc.", vol. 56, No. 12, 1973, pp. 628–633.
Mitomo et al, "Yogyo-Kyokai-Shi", 82, No. 942, 1974.

*Primary Examiner*—Jack Cooper
*Attorney, Agent, or Firm*—Armstrong, Nikaido, Marmelstein & Kubovcik

[57] ABSTRACT

A method of manufacturing highly purified silicon nitride including the steps of preparing a nitrogen-containing silane selected from the group consisting of tetra-amide-monosilane and silicon imide, and heat-treating the prepared nitrogen-containing silane in the presence of ammonia in an inner atmosphere at a temperature above 400° C. for a period of at least two hours to obtain silicon nitride, and cooling and collecting the silicon nitride thus formed. The step of preparing the nitrogen-containing silane comprises continuously reacting gaseous silicon tetra-chloride with gaseous ammonia in an inner atmosphere at a temperature of from $-30°$ to 70° C. to produce the nitrogen-containing silane as a product and collecting the product. The resultant silicon nitride so produced has a chlorine content of less than 0.05 weight percent and a nitrogen content of over 38 weight percent.

3 Claims, 2 Drawing Figures

(x 3000)

METHOD OF MANUFACTURING HIGH-PURITY SILICON NITRIDE POWDER

This is a continuation of application Ser. No. 188,587, filed Sept. 18, 1980, which is a continuation of application Ser. No. 111,093 filed Jan. 10, 1980, both of which are now abandoned.

BACKGROUNDS AND DETAILED EXPLANATION OF INVENTION

This invention is related to high-purity silicon nitride powder and its manufacturing methods. As well known, silicon nitride has the characteristics of:(1) high mechanical strength at elevated temperatures, (2) good resistance to the thermal shock and corrosion, (3) moderate thermal conductivities, (4) low thermal expansion coefficient, (5) higher chemical stability, and (6) high electric insulation.

Accordingly, silicon nitride has various uses, and as, for metal refining, ceramic industry, machine industry as refractory materials, corrosion resistance materials and insulators.

In recent years, silicon nitride has been given considerably higher interests as a high-performance ceramic material for gas turbines required for higher strength and resistance to thermal shock and corrosion at elevated temperatures.

Thermal and mechanical properties which are important factors as silicon nitride ceramics are greatly influenced by purity, crystal phase, particle size and particle shape of the raw material (silicon nitride).

Especially, fine and high purity alpha-phase nitride powder is required in order to satisfy the above-mentioned characteristics. Silicon nitride powder is generally manufactured by the following methods:

(1) By heating silica and graphite powder in a nitrogen atmosphere, silica powder being reduced by the said graphite powder to the active silicon. The silicon reacts with nitrogen.

This is generally called "silica reduction method". In this method, however, the reacted products are mixtures of alpha-silicon nitride, beta-silicon nitride, silicon oxynitride and silicon carbide. It is difficult to obtain high purity alpha phase at any time in this method.

(2) Green compact of silicon powder is heated in the current of nitrogen or ammonia, during which, the nitrogen-gas pressure is controlled at the temperature less than 1500° C.

The obtained silicon nitride by this method contains much beta phase silicon nitride and it is difficult to obtain fine powder in this method. Additionally, pulverization is necessary for a long time for obtaining fine powder, and addition of contamination to the product is inevitable in the pulverizing process. Thus the product is not suitable for the raw material in fabricating high-strength silicon nitride ceramics.

(3) As another method, silicon nitride is obtained by vapor-phase reaction of silicon halide with ammonia. By this method, it is possible to obtain high-purity alpha silicon nitride, however, the method is restricted for the preparation of nitride film, and is not suitable for the manufacture of silicon nitride powder.

(4) Whereas, in the method of thermal decomposition of silicon imide obtained by the conventional method in an inert atmosphere as nitrogen or argon atmosphere, fine silicon nitride powder can be easily obtained, for instance, in the use of silicon imide obtained by the conventional reaction of silicon halide with ammonia, it is inevitable to contain chloride as an impurity to the product, and in fabricating the sintered body of the silicon nitride, the essential defect is to disturb the densification of the body.

The above inventors have accomplished this invention as a result of earnest investigations for the production of high-purity silicon nitride powder after improvement of the above defects.

In other words, this invention provides high-purity silicon nitride powder which is suitable as a raw material of high density and high-purity silicon nitride ceramics, with higher content of nitrogen and very low content of chlorine and its manufacturing methods.

Detailed explanation of this invention will be made hereinafter. High-purity silicon nitride powder obtained by this invention contains chlorine only less than 0.05 weight percent and nitrogen more than 38 weight percent.

In fabricating silicon nitride ceramics in the use of the above silicon nitride powder, it is possible to obtain high density and high-strength silicon nitride ceramics at elevated temperatures.

The manufacturing method by this invention is as follows:

After heat-treatment of a nitrogen containing silicon compound in an ammonia-atmosphere, the obtained powder in the treatment is calcinated for obtaining silicon nitride as feature of this invention.

Here, nitrogen-containing silicon compounds used in this invention are tetra-amide mono-silane ($Si(NH_2)_4$) and silicon imide $Si(NH)_2$. These nitrogen-containing silane compounds used as raw materials can be manufactured by (1) reaction of gaseous silicon tetrachloride with solid ammonia at a low temperature, (2) reaction of solid silicon tetrachloride with gaseous ammonia at a low temperature, (3) reaction of silicon tetrachloride dissolved in n-hexane, and gaseous ammonia at 0° C. for obtaining Si $(NH)_2$.

Nitrogen-containing silane compounds manufactured by these methods can all be used as raw materials for this invention. However, in order to obtain very fine and high-purity silicon nitride powder of this invention, it is desirable to use nitrogen-containing silane compounds manufactured by the following synthetic method. That is, gaseous silicon tetrachloride and gaseous ammonia are introduced into reaction zone in the inert gas-atmosphere, such as nitrogen or argon atmosphere.

These reactants such as $SiCl_4$ and $NH_3$ react at the temperatures over −30° C. and less than 70° C., preferably 0°–70° C. or more preferably 10°–30° C. The mixture of silane compounds obtained by this synthetic method and by-produced ammonium chloride, or silane compounds eliminating ammonium chloride can be especially favorable in the use as a raw materials for this invention.

The reactions of $SiCl_4$ with $NH_3$ is done at about R. T. as above mentioned, thus there is no absorption of ammonia to the produced silane compounds. Also, the reaction-rate is high, thereby, it is sufficient to use stoichiometric amount of $SiCl_4$ and $NH_3$. Of course, these reactants may be introduced into the reacting zone continuously for the synthesis of silane compounds.

Sufficient time is necessary for contacting $SiCl_4$ with ammonia for the preparation of silane compounds, while these reactants react rather promptly at the above temperature for the preparation of silane compounds. A feature of this invention is to heat silane compounds obtained in the above synthetic method in an ammonia atmosphere.

An ammonia atmosphere in this invention means that of ammonia alone or the mixture of ammonia and inert gases such as ammonia and argon, ammonia and nitrogen, or ammonia and hydrogen.

In the use of the mixed gas of ammonia and other gases, the ratio of the mixture is not restricted particularly, however, it is desirable to use excessive gaseous ammonia.

The heat-treatment of nitrogen containing silane compounds obtained by the above method in an ammonia atmosphere should be done at the temperatures over 400° C., preferably over 600° C. by supplying the gas containing ammonia. At the temperatures less than 400° C. for the heat-treatment, it becomes incomplete to remove chlorine, combined in silane compounds, and it is unfavorable to contain the combined chlorine in silicon nitride powder. In this case, a longer heat-treatment time is necessary at lower temperatures and rather shorter time is enough at higher temperatures.

Generally, the standard time is that up to the stoppage of formation of by-products such as hydrogen chloride by the heat-treatment. Moreover, during heat-treatment, it is necessary to supply the sufficient amount of ammonia consumed for thermal decomposition of silane compounds. It is also desirable to circulate the gas containing ammonia in the reaction zone for removing the by-products. The maximum heat-treatment temperature of nitrogen containing silane compounds and later mentioning calcined temperature are not particularly restricted, and yet, it is undesirable to use higher temperatures over the necessary levels in view of saving energy.

Amorphous silicon nitride can be obtained by calcination of the powder obtained by the above heat-treatment in an atmosphere as it is, or in an inert atmosphere, at the temperature in the range of 1000° to 1200° C., while alpha-phase silicon nitride (over 95% of alpha-phase content) is obtained by calcination at a temperature in the range from 1200° to 1600° C. Also, beta phase silicon nitride can be obtained by calcination at the temperatures over 1600° C., respectively.

It is possible to make heat-treatment and calcination of silane compounds at the same temperature and at the same time in the same reaction zone. As aforementioned, it is possible to obtain silicon nitride having each special crystal phase by adjusting the calcination temperature, while the calcination temperature is not specially limited.

In the heat-temperature of nitrogen-containing silane compounds in this invention, it is desirable to use the furnace made of non-oxide material, e.g., silicon nitride, silicon carbide or carbon, in order to manufacture pure silicon nitride powder in this invention.

It is difficult to achieve the objective of this invention in the use of the furnace made of quartz, glass, alumina, mullite, magnesia, etc. By the above conditions, it is desirable to obtain high-purity silicon nitride powder over 38% content of nitrogen, and chlorine less than 0.05 weight percent.

Accordingly, when silicon nitride powder is used as a raw material for the sintered body, the body is useful as a structural component for gas-turbines, etc. which need higher strength, chemical and physical stability.

DESCRIPTION OF EMBODIMENT WITH EXAMPLES

Figure 1:
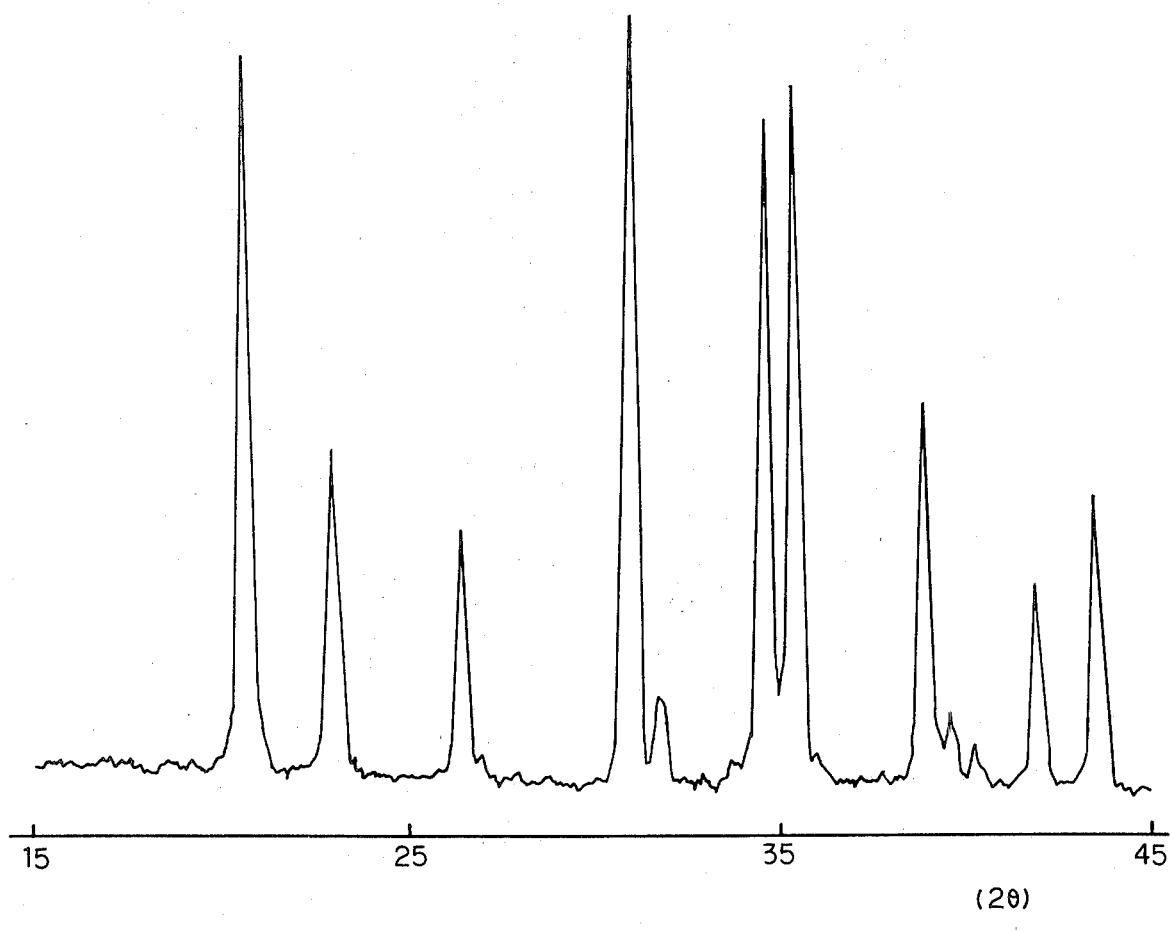

The following examples are not necessarily restricted to this invention.

EXAMPLES 1 and 2

A double tube was used for feeder of raw materials. The saturated vapor (25° C.) of $SiCl_4$ and nitrogen as a carrier gas was introduced to the reaction zone through the external tube of the feeder.

The flow rate was 35 g/hr of $SiCl_4$, and $NH_3$ was introduced to the reaction zone through the internal tube of the feeder. The flow rate was 20 g/hr of $NH_3$. The reaction zone (60 m/m $\emptyset \times$ 250 m/m) was kept at 10° C. by water-cooling.

The reaction was done continuously, and the fine product was carried by nitrogen gas from the reaction zone, and was collected into a container at the bottom of the reaction tube.

The above product 20 g was filled in the tube furnace of 50 mm $\emptyset$ made of silicon nitride, and it was heated at the elevated temperature at 200° C. in a mixed gas of nitrogen and hydrogen.

After the temperature reached that shown in Table 1, gaseous ammonia was introduced, while circulating the excessive ammonia up to the level of discharging the gas.

After being kept for 2 hours at the temperature, the introduction of gaseous ammonia was stopped, and the temperature was elevated up to 1300° C. After being kept for 2 hours at the atmosphere, the product was obtained. The mean particle size of the product was 0.1–0.5μ.

The results of chemical analysis and alpha phase content of this obtained powder are shown in Table 1.

In this analysis, chlorine content was determined by colorimetry.

TABLE I

|  | Introduction-temperature of gaseous ammonia | Chlorine content | Nitrogen content | Alpha-phase content |
|---|---|---|---|---|
| Example 1 | 300° C. | 0.35% | 38.2% | 95% |
| Example 2 | 800° C. | Less than 0.05% | 39.0% | 97% |

EXAMPLE 3

Comparative example to the above 1 and 2

In the similar manner to that of Example 1, nitrogen-containing silane compounds were heated at 200° C./hr in 3 types of the atmosphere shown in the following Table 2, and were kept at 1100° C. for 2 hours, thus each 3 types of products were obtained.

The chemical analysis and identification by X-ray diffraction of these produced powders were performed. The result of analysis is shown in Table 2.

TABLE 2

|  | Atmosphere | Chlorine content | Nitrogen content | Silicon content | Crystal phase by X-ray diffraction |
|---|---|---|---|---|---|
| Comparative Example 1 | $N_2$—$H_2$ | 3.0% | 37.9% | 57.0% | Amorphous |
| Comparative Example 2 | Ar | 3.5% | 37.6% | 57.1% | Amorphous |
| Example 3 | $NH_3$ | Less than | 38.8% | 59.8% | Amorphous |

TABLE 2-continued

| Atmosphere | Chlorine content | Nitrogen content | Silicon content | Crystal phase by X-ray diffraction |
|---|---|---|---|---|
| | 0.05% | | | |

EXAMPLES 4 AND 5

Comparative Example 3 and 4

Nitrogen-contanining silane compounds produced by the similar manner to that of Example 1 were heated at 200° C./hr in the atmospheres in 3 types as shown in the following Table 3, followed by being kept at 1400° C. for 2 hours, and each 4 types of powder were obtained. Table 3 shows the result of chemical analysis and alpha-phase content. FIG. 1 shows the diagram of X-ray diffraction (Cu-Kd, 2θ) of the product obtained by Example 4.

Figure 2:

Likewise, FIG. 2 shows the electron-microscopic picture at a 300 times magnification.

TABLE 3

| | Atmosphere | Chlorine content | Nitrogen content | Alpha-phase content |
|---|---|---|---|---|
| Comparative Example 3 | $N_2$—$H_2$ | 0.20% | 38.4% | 95% |
| Comparative Example 4 | Ar | 0.26% | 38.3% | 95% |

TABLE 3-continued

| | Atmosphere | Chlorine content | Nitrogen content | Alpha-phase content |
|---|---|---|---|---|
| Example 4 | $NH_3$ | Less than 0.05% | 39.1% | 98% |
| Example 5 | $NH_3$—$N_2$ (70:30) | Less than 0.05% | 39.0% | 98% |

What we claim is:

1. A method of manufacturing highly purified silicon nitride including the steps of:
preparing a nitrogen-containing silane selected from the group consisting of tetra-amide-monosilane and silicon imide;
heat-treating the prepared nitrogen-containing silane in the presense of ammonia in an inert atmosphere at a temperature above 400° C. for a period of at least 2 hours to obtain silicon nitride, and cooling and collecting the silicon nitride thus formed;
wherein the step of preparing the nitrogen-containing silane comprises continuously reacting gaseous silicon tetrachloride with gaseous ammonia in an inert gas atmosphere at a temperature of from −30° to 70° C. to produce the nitrogen-containing silane as a product; and
collecting the product; the resultant silicon nitride so produced having a chlorine content of less than 0.05 weight percent and a nitrogen content of over 38 weight percent.

2. The method of claim 1 wherein the temperature of continuous reacting is from 0° to 70° C.

3. The method of claim 1 wherein the temperature of continuous reacting is from 10° to 30° C.

* * * * *